Jan. 29, 1929.

C. K. SCHENCK 1,700,652

RADIO RECEIVING CIRCUIT

Filed March 12, 1926

WITNESSES
Chas. F. French
Helen Kelley Schenck
Louis Bertram French

INVENTOR
Christean Kelean Schenck

Patented Jan. 29, 1929.

1,700,652

UNITED STATES PATENT OFFICE.

CHRISTIAN KILIAN SCHENCK, OF NEW YORK, N. Y.

RADIO RECEIVING CIRCUIT.

Application filed March 12, 1926. Serial No. 94,146.

This invention relates to radio systems, and more particularly to the circuit of a radio receiving system.

The object of this invention is to provide a simple circuit which will operate a loud speaker, and which is capable of picking up distant transmitting stations, and, furthermore, which can be operated at a minimum cost.

Another object is the elimination of undesirable oscillations.

In the accompanying drawings.

Like reference characters designate like parts throughout the several figures.

Figure 1:
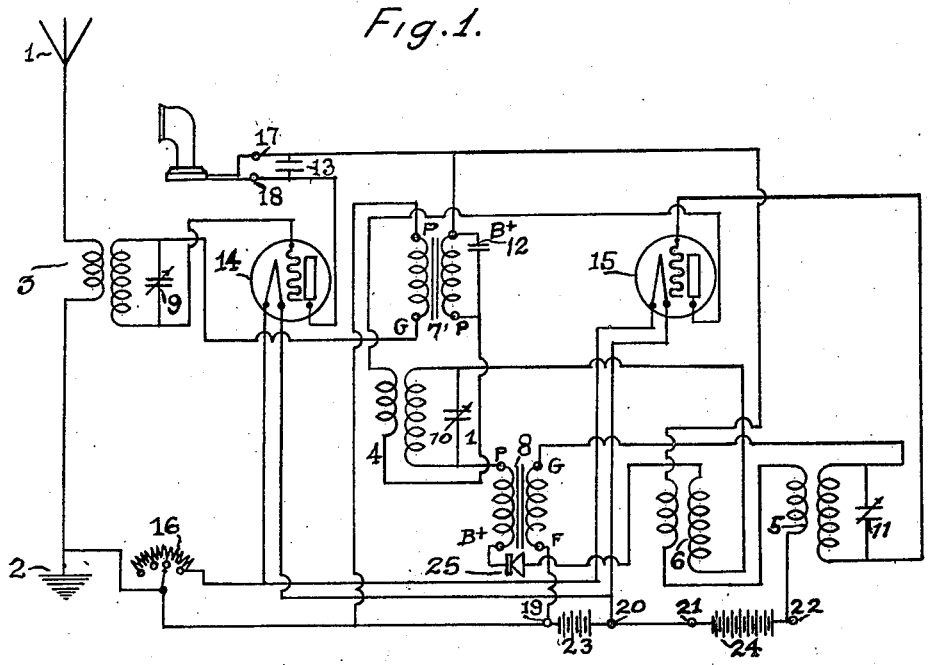
Figure 1 is a schematic drawing of one circuit arrangement showing the arrangement and connections of the apparatus used.

In accordance with this invention means are provided for receiving electrical oscillations, for amplifying them, for detecting them, and for amplifying them again, after detection.

The term "audion" as used in this application, refers to any electric amplifying device containing an input electrode referred to as the "grid"; an output electrode referred to as the "plate"; and a common electrode referred to as the "filament"; the electric power output being controlled electrostatically by the input voltage between the grid and the filament.

The circuit comprises an antenna 1; a ground 2; the radio-frequency transformers 3, 4, 5 and 6; the audio-frequency transformers 7 and 8; the variable condensers 9, 10 and 11; the fixed condensers 12 and 13; the audions 14 and 15; the rheostat 16; the phone binding posts 17 and 18; the "A" battery binding posts 19 and 20; the "B" battery binding posts 21 and 22; the "A" battery 23; the "B" battery 24, and the crystal detector 25.

The variable condensers 9, 10 and 11, are preferably of a capacity of .0005 mfd. Good rotor contact is necessary. Brass plate condensers are preferable.

The variable condenser 9 is shunted across the secondary of the antenna transformer 3. The variable condenser 10 is shunted across the secondary of the radio-frequency transformer 4. The variable condenser 11 is shunted across the secondary of the radio-frequency transformer 5. In each case, to avoid the effects of hand capacity, the high potential end of the secondary is connected to the stator plates, and the low potential end to the rotor plates.

The fixed condenser 12 is of .001 mfd. capacity, and is shunted across the audio-frequency transformer 7, that is, one end of said condenser is connected to the B+ (B plus) terminal and the other end to the plate terminal of the said transformer.

The fixed condenser 13 is of .005 mfd. capacity and is fastened respectively to the binding posts 17 and 18; in other words, it shunts the loud speaker terminals.

The audions used are the U. V. 201A type. A six volt "A" battery is employed. A one hundred volt "B" battery is used for loud speaker operation.

The method of operation is as follows:

Referring to Figure 1, the incoming electromagnetic waves are received by antenna 1, causing a current to flow in the primary winding of the transformer 3 to ground at 2. A current is now induced in the secondary winding of the transformer 3, and is impressed upon the grid of the audion 14, over the following circuit: from the ground 2, winding of the transformer 7, secondary winding of transformer 3, to the grid of the audion 14.

The action of the grid of the audion 14 causes a voltage to be impressed upon the associated plate, over the following circuit: from the positive side of the "B" battery 24, terminal 22, primary windings of transformers 5 and 6 in series, condenser 13, to the plate of the audion 14.

The current flowing in the primary winding of the transformer 6 causes a current to be induced in the associated secondary winding. It will be observed that the secondary winding of the transformer 6 forms a part of a local circuit including the detector 25, as follows: secondary windings of transformers 6 and 4 in series, primary winding of transformer 8 to the crystal detector 25. The first stage of radio-frequency is accordingly detected by the crystal detector 25 over the said local circuit.

The audio-frequency current now flowing in the local circuit including the crystal detector 25 and the primary winding of the audio-frequency transformer 8 induces a current of like characteristics in the secondary winding of transformer 8, which, in series with the secondary winding of the radio-frequency transformer 5, is included in the grid circuit of the audion 15.

The first stage of radio-frequency flowing in the primary winding of the transformer 5 induces a corresponding radio-frequency current in the associated secondary winding, which, as heretofore stated, is included in the grid circuit of the audion 15 in series with the secondary winding of the audio-frequency transformer 8. It thus appears that in the circuit including the grid of the audion 15, secondary windings of transformers 5 and 8 in series, an audio-frequency current is superimposed upon the amplified radio-frequency current. The waves thus superimposed one upon another, are simultaneously amplified by the audion 15 over the following circuit: from the positive side of the "B" battery 24, terminal 22, primary windings of transformers 5, 6, 7 and 4 in series, to the plate of the audion 15. It thus appears that the audion 15 is functioning as a second-stage radio-frequency amplifier and as a first-stage audio-frequency amplifier, simultaneously.

It will be observed that the secondary windings of the radio-frequency transformers 4 and 6 are included in local circuit with the crystal detector 25. The second-stage of radio-frequency flowing in the primary windings of transformers 4 and 6 will accordingly induce a current of like characteristics in the associated secondary windings of the same transformers, and the crystal detector 25 will proceed to detect this second stage of radio-frequency, thus producing an audio-frequency current in the detector circuit.

The amplified audio-frequency current composited with the re-amplified radio-frequency current in the audion 15 flows through the primary winding of the transformer 7, as heretofore described. An audio-frequency current of like characteristics is induced in the associated secondary winding of the same transformer and is impressed upon the grid of the audion 14 over the following circuit: from the negative side of the "A" battery 23, terminal 19, winding transformer 7, secondary winding of the transformer 3, to the grid of the audion 14. The audio-frequency current thus impressed upon the grid is amplified a second time and the current thus amplified flows over the following circuit: from the plate of the audion 14, terminal 18, loud speaker, terminal 17, primary windings of transformers 6 and 5 in series, terminal 22, to the positive side of the "B" battery 24. It thus appears that the audio-frequency current obtained by the detection of the first stage of radio-frequency current and thereafter twice amplified is impressed upon the loud speaker.

Simultaneously with the re-amplification of the audio-frequency current the second stage of radio-frequency was detected by the detector 25 as heretofore described. The audio-frequency current resulting from the detection of the second stage of radio-frequency flows in the detector circuit including the primary winding of the audio-frequency transformer 8. An audio-frequency current of like characteristics is induced in the associated secondary winding of the same transformer and is impressed upon the grid of the audion 15 over the circuit, including the secondary winding of the transformer 5. This audio-frequency current is amplified by the audions 15 and 14 in sequence, in the same manner as the audio-frequency current which resulted from the detection of the first stage of radio-frequency. The audio-frequency current last amplified is accordingly also impressed upon the loud speaker.

Owing to the exceedingly high velocity of electricity the interval elapsing between the operation of the loud speaker by the first amplified audio-frequency, and the reception of the second amplified audio-frequency, is infinitesimal and therefore not discernible to the human ear. In consequence, for all practical purposes we may say that the two separate impulses of audio-frequency operate the loud speaker simultaneously.

It will be observed that the amplification takes place in the following order: first stage of radio-frequency in the audion 14; second stage of radio-frequency in the audion 15; first stage of audio-frequency in the audion 15; second stage of audio-frequency in the audion 14. In other words, in amplifying the audio-frequency current the audions 14 and 15 are used in inverse order to the manner in which they are used in amplifying the radio-frequency current. There is a certain advantage from this arrangement. It is obvious that as the audion 15 is utilized for the second stage of radio-frequency amplification, it carries a greater load as a radio-frequency amplifier than the audion 14. It is also obvious that as the audion 14 is utilized for the second stage of audio-frequency amplification it carries a greater load as an audio-frequency amplifier than does the audion 15. By subjecting the audion 14 to the lower radio-frequency load and the higher audio-frequency load, and the audion 15 to the higher radio-frequency load and the lower audio-frequency load, the total load carried by each of the audions is more nearly equalized than would be the case if the audion 14 was employed as a first-stage radio- and audio-frequency amplifier, and the audion 15 was employed as a second-stage radio- and audio-frequency amplifier.

So far as I am aware, the simultaneous amplification in a single audion of an audio-frequency current superimposed upon an amplified radio-frequency current in the manner described, is entirely new.

This circuit arrangement also provides means for stabilization in what I believe to be a new and novel manner. It will be observed that the radio-frequency current induced in the secondary winding of the transformer 3 is imposed upon the grid of the audion 14, over a circuit including the secondary winding of the audio-frequency transformer 7. Owing to the presence of the iron core in this transformer the secondary winding operates as a choke-coil and tends to stabilize the radio-frequency current.

Again, considering the first stage of radio-frequency current flowing through the primary windings of transformers 6 and 5 in series, it will be recalled that a portion of this current energy was transferred by induction to the secondary winding of the transformer 6, for detection by the detector 25, and the remainder was transferred by induction to the secondary winding of the transformer 5, and was thence impressed upon the grid of the audion 15 for further amplification. By reducing the strength of the radio-frequency current impressed upon the grid of the audion 15 in the manner described, the strength of any undesirable component composited therewith, which may tend to produce oscillation, is, necessarily, also reduced. Consequently, in raising the radio-frequency current thus reduced in strength, to the second stage of radio-frequency amplification, any undesirable component composited therewith is, necessarily, also reduced in strength. It thus appears that there is a tendency to dissipate any undesirable component composited with the radio-frequency current, so as to prevent undesirable oscillations.

Figure 2:
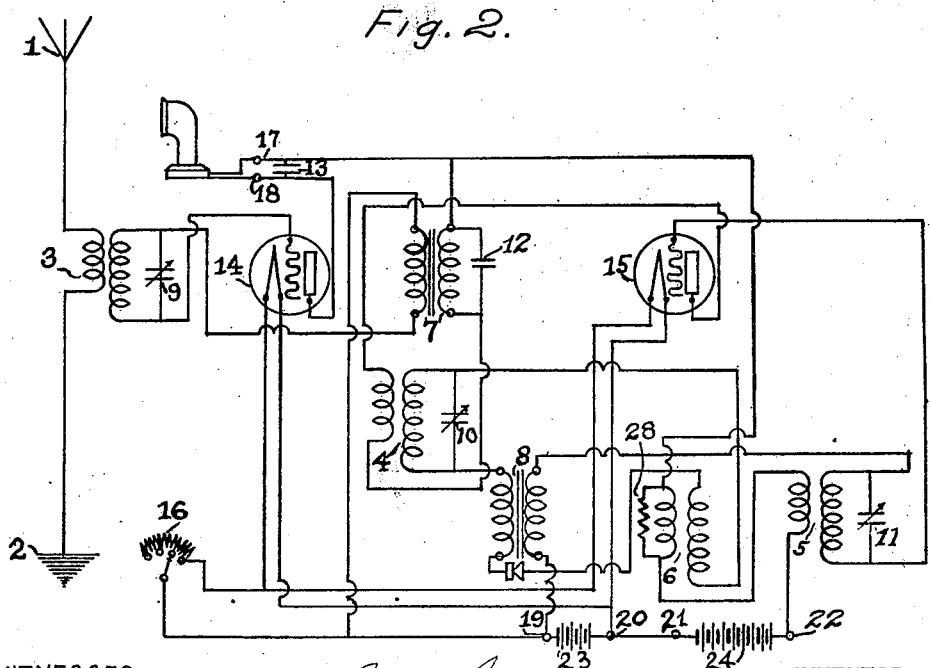
Figure 2 is a schematic drawing of another circuit varying slightly from the system disclosed and embodied in Figure 1.

The circuit shown in Figure 2 is practically the same as that shown in Figure 1. However, it differs in three particulars. First, the filament circuit is not grounded, that is, the "A" binding post 19 is not connected to the ground 2. Secondly, the primary of the radio-frequency transformer 4 is wound in the same direction as the secondary. Thirdly, the primary of the transformer 6 is shunted by a two megohm resistance 28. However, a fixed condenser of the value of .002 mfd. could be used in place of the resistance just specified. The effect of the resistance 28 is to greatly increase the volume output of the circuit.

What is claimed is:

1. In a system for receiving oscillations having the characteristics of a radio-frequency current, means for amplifying said oscillations, means for detecting a portion of the amplified oscillations to convert them into an audio-frequency current, means for superimposing the audio-frequency current upon the amplified radio-frequency current, and means for amplifying the radio- and audio-frequency currents thus superimposed simultaneously.

2. In a signalling system means for amplifying radio-frequency current, means for detecting a part thereof to produce an audio-frequency current and for superimposing said audio-frequency upon said radio-frequency current, and means for amplifying the audio- and radio-frequency currents simultaneously.

3. In a signalling system means for amplifying radio-frequency current, means for detecting a part thereof to produce a current of audio-frequency, means for superimposing one current upon the other, and means comprising an audion for amplifying the audio-frequency current and re-amplifying the radio-frequency current simultaneously.

4. In a radio receiving system means for amplifying a radio-frequency current, means for detecting a part thereof to produce a current of audio-frequency, means for superimposing one current upon the other to produce a composite wave and means for amplifying the composite wave.

5. In a radio-receiving system means for amplifying a radio-frequency current, means for detecting a part thereof to produce a current of audio-frequency, means for superimposing one current upon the other to produce a composite wave, means for amplifying the composite wave, and means for separating the amplified composite wave into its audio-frequency and radio-frequency components.

6. In a radio receiving system a plurality of audions adapted to be used in sequence as radio-frequency amplifiers and in inverse sequence as audio-frequency amplifiers, means for detecting a portion of the radio-frequency current prior to its amplification by the last radio-frequency amplifier in the sequence to produce a current of audio-frequency, and means for superimposing said audio-frequency current upon the radio-frequency at the grid of the last audion in the radio-frequency sequence to permit the last stage of radio-frequency and the said audio-frequency current to be amplified simultaneously.

7. In a radio receiving system a first audion, a second audion, the first audion adapted to be used as a first stage radio-frequency amplifier and as a second stage audio-frequency amplifier, the second audion adapted to be used as a second stage radio-frequency amplifier and as a first stage audio-frequency amplifier, a detector, and a circuit including said detector for inductively coupling the same between the plate of the first audion and the grid of the second.

8. In a radio-receiving system a first audion, a second audion, the first audion adapted to be used as a first stage radio-frequency amplifier and as a second stage audio-frequency amplifier, the second audion adapted to be used as a second stage radio-frequency amplifier and as a first stage audio-frequency amplifier, a radio-frequency circuit coupling between the plate of the first audion and the grid of the second, an audio-frequency circuit-coupling between the plate of the second audion and the grid of the first, a detector, a circuit therefor, a plurality of couplings for said detector circuit comprising a radio-frequency coupling with the plate of the first audion, an audio-frequency coupling with the grid of the second audion, and a radio-frequency coupling with the plate of the second audion.

9. In a radio receiving system a first audion, a second audion, means for amplifying radio-frequency current to the first stage of amplification comprising said first audion, means comprising a detector for detecting a portion of the radio-frequency current thus amplified, means comprising the second audion for simultaneously amplifying the balance of the first stage of radio-frequency current to the second stage of amplification and the audio-frequency current to the first stage of amplification, means comprising the second audion for amplifying the first stage of audio-frequency current to the second stage of amplification, and means comprising said detector for detecting the second stage of radio-frequency current and for impressing the resulting audio-frequency current upon the second and first audions in sequence to amplify the same through two more stages of amplification.

10. In a radio receiving system the combination with a plurality of radio-frequency amplifiers each amplifier comprising an audion, of means for stabilizing oscillations comprising an audio-frequency transformer in the grid circuit of the first audion, and a device intermediate the plate of the first audion and the grid of the second for transforming a part of the radio-frequency current into a current of audio-frequency.

Signed at New York, in the county of New York and State of New York, this 10th day of March, A. D. 1926.

CHRISTIAN KILIAN SCHENCK.